Patented July 15, 1924.

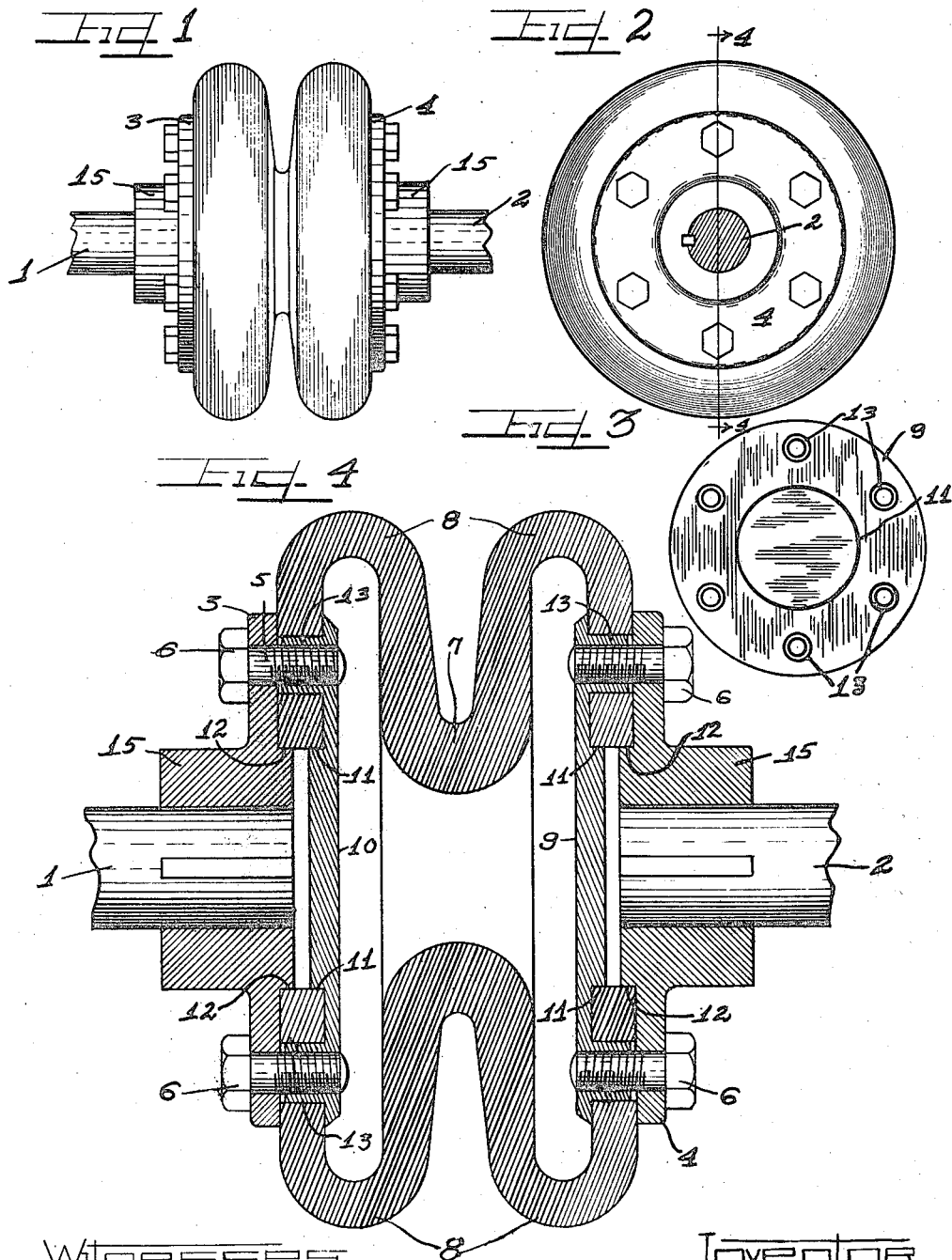

1,501,187

UNITED STATES PATENT OFFICE.

CHARLES L. RAYFIELD, OF CHICAGO, ILLINOIS.

FLEXIBLE COUPLING.

Application filed September 8, 1921. Serial No. 498,280.

*To all whom it may concern:*

Be it known that I, CHARLES L. RAYFIELD, a citizen of the United States, and a resident of the city of Chicago, in the county of Cook and State of Illinois, have invented certain new and useful Improvements in a Flexible Coupling; and I do hereby declare that the following is a full, clear, and exact description of the same, reference being had to the accompanying drawings and to the numerals of reference marked thereon, which form a part of this specification.

It is an object of this invention to provide a flexible connection for uniting two shafts which run nearly but not exactly in line with one another.

It is a further object of this invention to provide such a coupling that shall be tough and durable, and not likely to do any serious injury if it breaks when in rotation.

It is a further object of this invention to provide a coupling of this sort which may be readily and inexpensively assembled and which is inexpensive to manufacture.

Other and further important objects of this invention will be apparent from the disclosures in the drawings and the accompanying specification.

It is a further object of this invention to devise a coupling which shall not only permit one shaft to be at an angle or out of line with the other but shall also permit one shaft to rotate slightly relative to the other; such relative rotation giving rise to forces within the coupling tending to bring the shafts back to their original relative position.

The invention (in a preferred form) is illustrated in the drawings and hereinafter more fully described.

On the drawings:

Figure 1 is a side view of the coupling.
Figure 2 is an end view of the same.
Figure 3 is a view of a washer used in the coupling.
Figure 4 is a section upon the line 4—4 of Figure 2.

As shown on the drawings:

The object of the coupling is to rotatably connect shaft 1 to shaft 2. For this purpose a disk 3 is keyed to the shaft 1 and a disk 4 to the shaft 2. Each of the disks is provided with a plurality of holes 5 to receive bolts 6, and with a hub 15 to afford ample bearing for the keys.

The coupling proper consists of a hollow tubular piece of material formed into an hour-glass shape with open ends. It has a constricted portion 7 which is preferably constructed of somewhat thicker material, as shown in Figure 4, and larger portions 8. The constricted portion 7 is of considerably larger diameter than the shaft. The portions 8 are of considerably larger diameter than the disks or the plates secured thereto.

These plates 9 and 10 are secured against the inner faces of the edges of the flexible member. This securing may be conveniently accomplished by vulcanizing the flexible members thereto. The central portions of the plates are made thicker than the edge portions in order to afford shoulders 11 for accurately positioning the edges of the flexible member; and the inner faces of the disks 3 and 4 are provided with central upstanding parts to afford similar shoulders 12 for the same purpose. The thin edge portions of the disks are provided with a series of bosses 13 which go through the holes prepared in the edges of the flexible member to receive them. Each of these bosses is threaded to receive a bolt 6 and the height of the bosses is slightly less than the thickness of the flexible material in order that tightening the bolt 6 may positively compress the material between the plate 9 and the disks 4 in the one case and between the plate 10 and the disk 3 in the other case.

The flexible connecting member may be made of layers of fabric such as canvas or of alternate layers of cordage and rubber as an automobile tire is made. Any sufficiently tough and strong flexible material may be used however. One advantage of non-metallic material is that if the connection breaks in action the pieces thrown off by centrifugal force are not likely to do harm.

Another advantage is that the hour-glass shaped member can yield tortionally much more than a metal member of such a shape could. This will enable the coupling to absorb small shocks by acquiring a small twist while the driving shaft goes ahead of the other and then to restore the relation by untwisting and so bringing up the driven shaft.

In the assembly of the device, the disk 3 is placed upon the shaft 1 and keyed thereto. The plate 10 is introduced through the end of the flexible member and the studs 13 are placed through the holes in the edge of the flexible member near this end. The flexible character of this member enables the disk to be so introduced and brought to the position where the studs may be placed through the holes. The bolts 6 are then put through the disk 3 into the bosses in the plate 10 and tightened. The plate 9 is then introduced in the same way into the other end of the flexible member, the disk 4 is keyed to the shaft 2 and the bolts 6 are introduced through the holes in the disk 4 into the bosses on the plate 9 and tightened.

When the driving shaft rotates, the bolts 6 and the tightness of the plate 10 against the flexible member cause it to rotate with the shaft and it will drive the other plate and disk and so drive the other shaft. As the rotation occurs the part of the flexible member on the concave side of the angle formed by the two shafts will be compressed so that the portions 8 approach one another and the other part will be extended so that the portions 8 recede from one another. Because of its corrugated shape, the flexure of the member will not be confined to any one portion of its length but will be distributed throughout the length of the connection. Consequently, there will be no single point which will tend to wear out and break before any other point and the life of the device will be long.

I am aware that numerous details of construction may be varied through a wide range without departing from the principles of this invention, and I therefore do not purpose limiting the patent granted otherwise than necessitated by the prior art.

I claim as my invention:

1. A shaft, a disk keyed on said shaft, a shoulder on said disk, a plate, a shoulder on said plate, bosses on said plate having screw threaded holes therein, bolts through said disk extending into said bosses whereby said plate is held adjacent to said disk with the shoulders aligned, and a flexible member secured between the disk and plate by said bolts, the thickness of said flexible member being greater than the height of said bosses.

2. A shaft, a disk keyed on said shaft, a shoulder on said disk, a plate, a shoulder on said plate, said shoulders being in alignment, bosses on said plate having screw threaded holes therein, and of a height greater than the combined height of said shoulders, bolts through said disk extending into said bosses whereby said plate is held adjacent to said disk with the shoulders aligned, and a flexible member secured between the disk and plate by said bolts, the thickness of said flexible member being greater than the height of said bosses, and the inner edge of said flexible member abutting against said shoulders.

In testimony whereof I have hereunto subscribed my name in the presence of two subscribing witnesses.

CHARLES L. RAYFIELD.

Witnesses:
CARLTON HILL,
JAMES M. O'BRIEN.